US012706531B2

(12) United States Patent
Yang et al.

(10) Patent No.: US 12,706,531 B2
(45) Date of Patent: Aug. 11, 2026

(54) RESONANT CONVERTER AND METHOD OF OPERATING THE SAME

(71) Applicant: DELTA ELECTRONICS, INC., Taoyuan City (TW)

(72) Inventors: Shang-Kay Yang, Taoyuan City (TW); Hsien-Kai Wang, Taoyuan City (TW); Yen-Wei Lin, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 200 days.

(21) Appl. No.: 18/408,129

(22) Filed: Jan. 9, 2024

(65) Prior Publication Data

US 2025/0070655 A1 Feb. 27, 2025

(30) Foreign Application Priority Data

Aug. 23, 2023 (CN) ........................ 202311066340.X

(51) Int. Cl.
*H02M 3/00* (2006.01)
*H02M 3/335* (2006.01)

(52) U.S. Cl.
CPC ......... *H02M 3/01* (2021.05); *H02M 3/33576* (2013.01)

(58) Field of Classification Search
CPC .... H02M 3/01; H02M 3/015; H02M 3/33571; H02M 3/33573; H02M 3/33592; H02M 1/44; H02M 1/15
See application file for complete search history.

(56) References Cited

U.S. PATENT DOCUMENTS

| | | | | |
|---|---|---|---|---|
| 10,686,382 B2 * | 6/2020 | Bianco | ................ | H02M 3/3376 |
| 10,693,366 B2 | 6/2020 | Wang | | |
| 11,677,326 B2 * | 6/2023 | Yang | .................. | H02M 1/0032 363/17 |

(Continued)

FOREIGN PATENT DOCUMENTS

| | | |
|---|---|---|
| CN | 102594135 B | 12/2013 |
| CN | 105958814 B | 10/2018 |

(Continued)

OTHER PUBLICATIONS

Machine Translation TW-202037054-A (Year: 2020).*
Office Action dated Jul. 10, 2024 of the corresponding Taiwan patent application No. 112131633.

*Primary Examiner* — Thienvu V Tran
*Assistant Examiner* — Yahveh Comas Torres
(74) *Attorney, Agent, or Firm* — MUNCY, GEISSLER, OLDS & LOWE, P.C.

(57) ABSTRACT

A resonant converter converts a DC voltage into an output voltage. The resonant converter includes a transformer, a primary-side circuit, and a control module. The primary-side circuit receives the DC voltage, and includes a resonant circuit. The resonant circuit is coupled to the primary-side winding to form a resonant module. The control module is coupled to the primary-side circuit, and controls the primary-side circuit to convert the DC voltage so as to generate a winding voltage at two ends of the resonant module. When the control module detects that an output current of the resonant converter is in a current interval between a predetermined current and a rated current, the control module adjusts a duty cycle of the winding voltage with a variation.

13 Claims, 12 Drawing Sheets

(56) References Cited

U.S. PATENT DOCUMENTS

| | | | | |
|---|---|---|---|---|
| 2012/0120685 | A1* | 5/2012 | Liu .................. | H02M 3/33592 363/21.01 |
| 2018/0191252 | A1* | 7/2018 | Bianco .................. | H02M 3/01 |
| 2021/0067046 | A1 | 3/2021 | Adragna | |
| 2021/0313875 | A1 | 10/2021 | Messina | |

FOREIGN PATENT DOCUMENTS

| | | | |
|---|---|---|---|
| CN | 113179027 | A | 7/2021 |
| CN | 115940605 | A | 4/2023 |
| CN | 116073664 | A | 5/2023 |
| TW | 202037054 | A | * 10/2020 |

* cited by examiner

Sc1~Sc2 control module

4

RESONANT CONVERTER AND METHOD OF OPERATING THE SAME

BACKGROUND

Technical Field

The present disclosure relates to a resonant converter and a method of controlling the same, and more particularly to a resonant converter with a function of frequency jitter and a method of controlling the same.

Description of Related Art

The statements in this section merely provide background information related to the present disclosure and do not necessarily constitute prior art.

With the rapid development of the information industry, power supplies have played an indispensable role. The input voltage of information and home appliances is divided into AC voltage and DC voltage, and power supplies can generally be divided into two stage. In general, the first stage is usually an AC-to-DC converter (i.e., a power factor corrector) and the second stage is usually a DC-to-DC converter (i.e., a resonant converter). As shown in FIG. 1A, when the power supply is supplied by the AC mains voltage Vac, the output voltage Vo of the first-stage AC-to-DC converter has a voltage ripple with double-frequency characteristic of the AC mains voltage Vac. In order to adjust the output voltage of the second-stage DC-to-DC converter, its operation frequency, as shown in FIG. 1B, will change in the frequency range R1 of ±6 kHz at a rated power of about 85 kHz. This frequency variation of ±6 kHz is similar to a frequency jitter. Such a characteristic enables the EMI (electromagnetic interference) energy generated by the DC-to-DC converter to be evenly distributed in the frequency range R1 of ±6 kHz, and the double frequency range of approximately 170 kHz±12 kHz. Therefore, better EMI suppression can be implemented.

However, as shown in FIG. 1C, when the power supply is supplied by the DC voltage Vdc, the output voltage Vo of the first-stage DC-to-DC converter does not have the voltage ripple with double-frequency characteristic of the AC mains voltage Vac. Therefore, the adjusted operation frequency of the second-stage resonant converter (as shown in FIG. 1D) will occur a small variation in the frequency range R2 of ±0.2 kHz. Since the operation frequency varies very little, the EMI energy generated by the DC-to-DC converter will be concentrated at N times (N=1, 2, 3 . . . ) of the current operation frequency. Due to the lack of frequency jitter characteristics, the effect of suppressing EMI is extremely poor.

Therefore, the existing related-art manners of solving the above problems are as follows. 1. Enhancing the EMI attenuation capability, but this will make the design of the resonant converter more difficult, and it will not be possible to reduce the circuit size and reduce the circuit cost. 2. Adjusting the operation frequency of the resonant converter so that it avoids the specification value (150 kHz) which is the lowest limit of the safety regulations. For example, if the operation frequency is designed at 70 kHz, the double frequency is 140 kHz, which is still less than the specification value of 150 kHz. Therefore, the design of the resonant converter is restricted. 3. Specially producing frequency jitter effect. This manner fixes the output voltage Vout of the first stage converter, and specifically changes the operation frequency of the resonant converter by ±6 kHz. However, since the operation frequency is specially changed, there will be a low-frequency voltage ripple in the output voltage Vout of the DC-to-DC converter.

Therefore, the present disclosure provides a resonant converter and a method of operating the same to make the resonant converter have a better EMI suppression effect so that the EMI value measured by the resonant converter meets the international standard values.

SUMMARY

In order to solve the above-mentioned problems, the present disclosure provides a resonant converter. The resonant converter converts a DC voltage into an output voltage, and the resonant converter includes a transformer, a primary-side circuit, and a control module. The transformer includes a primary-side winding. The primary-side circuit receives the DC voltage. The primary-side circuit includes a resonant circuit, and the resonant circuit is coupled to the primary-side wining to form a resonant module. The control module is coupled to the primary-side circuit, and the control module controls the primary-side circuit to convert the DC voltage so as to generate a winding voltage at two ends of the resonant module. When the control module detects that an output current of the resonant converter is in a current interval between a predetermined current and a rated current, the control module adjusts a duty cycle of the winding voltage with a variation.

In order to solve the above-mentioned problems, the present disclosure provides a method of operating a resonant converter. The resonant converter includes a transformer and a primary-side circuit. The primary-side circuit includes a resonant circuit, and the resonant circuit is coupled to a primary-side winding of the transformer to form a resonant module. The method includes steps of: controlling the primary-side circuit to convert a DC voltage so as to control the resonant converter converting the DC voltage into an output voltage to generate a winding voltage at two ends of the resonant module, detecting an output current of the resonant converter, and adjusting a duty cycle of the winding voltage with a variation when determining that the output current is in a current interval between a predetermined current and a rated current, and adjusting the duty cycle to control an operation frequency of the resonant convert to vary within a frequency range, and the frequency range is positively related to the variation.

The main purpose and function of the present disclosure is that when the control module detects that the output current rises to a certain level, the control module adjusts the duty cycle of the winding voltage by a variation to achieve the function of frequency jitter so as to reduce the EMI value and make the EMI value meet the international standard values.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1A:
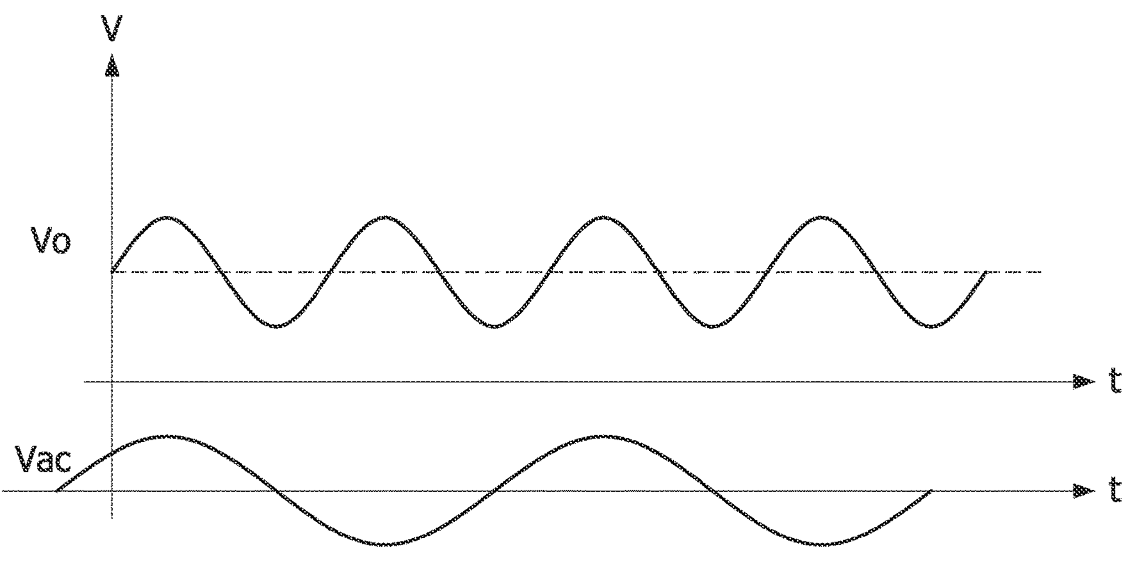
FIG. 1A is a waveform diagram of supplying a conventional power supply by an AC mains.
Figure 1B:
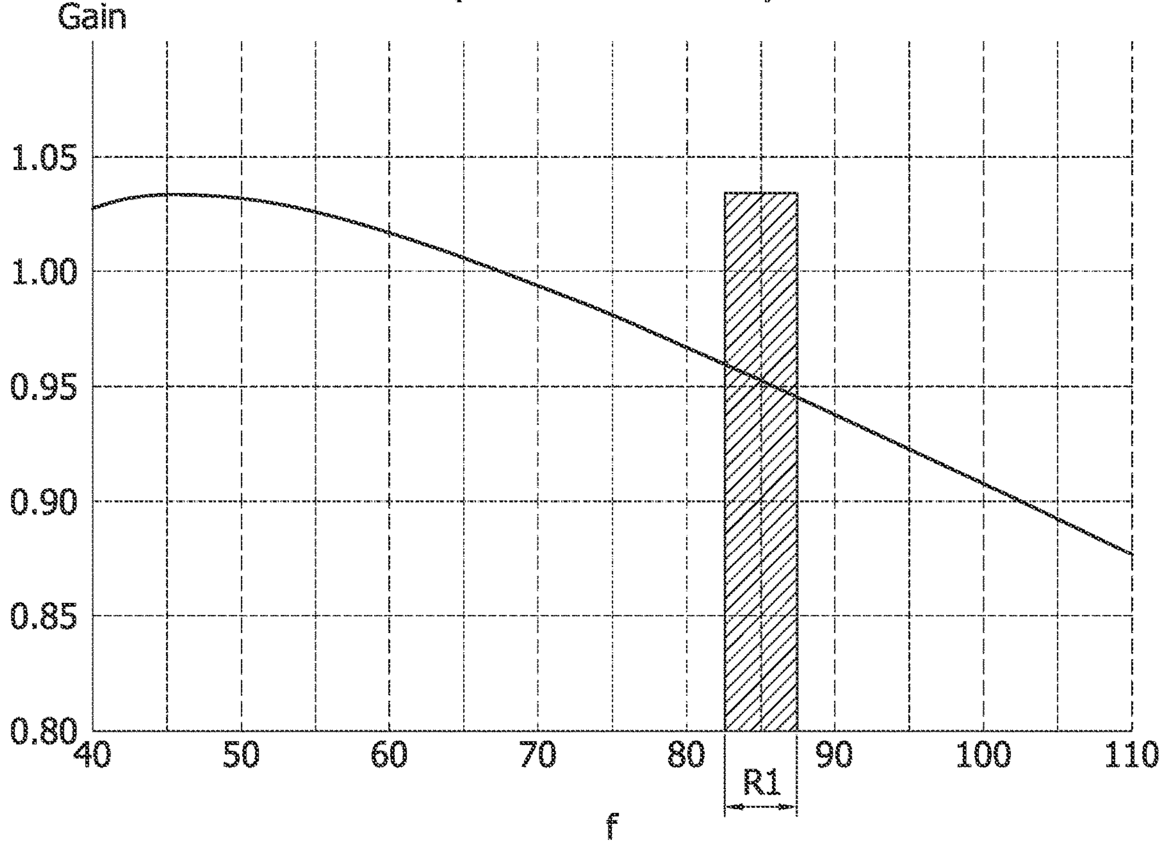
FIG. 1B is a frequency characteristic diagram of supplying a conventional resonant converter by an AC mains.
Figures 1C, 1D:
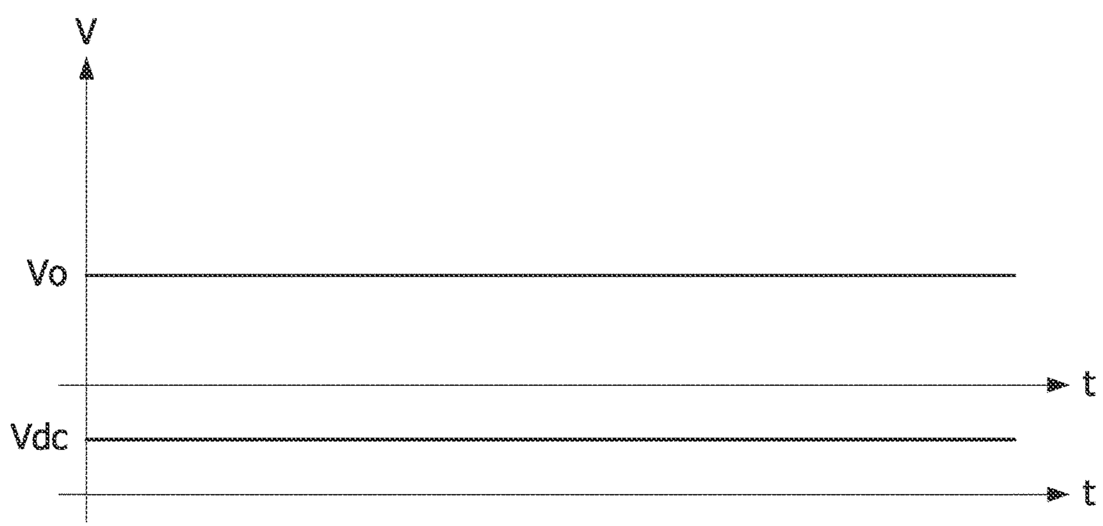
FIG. 1C is a waveform diagram of supplying a conventional power supply by a DC voltage.
FIG. 1D is a frequency characteristic diagram of supplying a conventional resonant converter by a DC voltage.

Reference will now be made to the drawing figures to describe the present disclosure in detail. It will be understood that the drawing figures and exemplified embodiments of present disclosure are not limited to the details thereof.

Figure 2A:
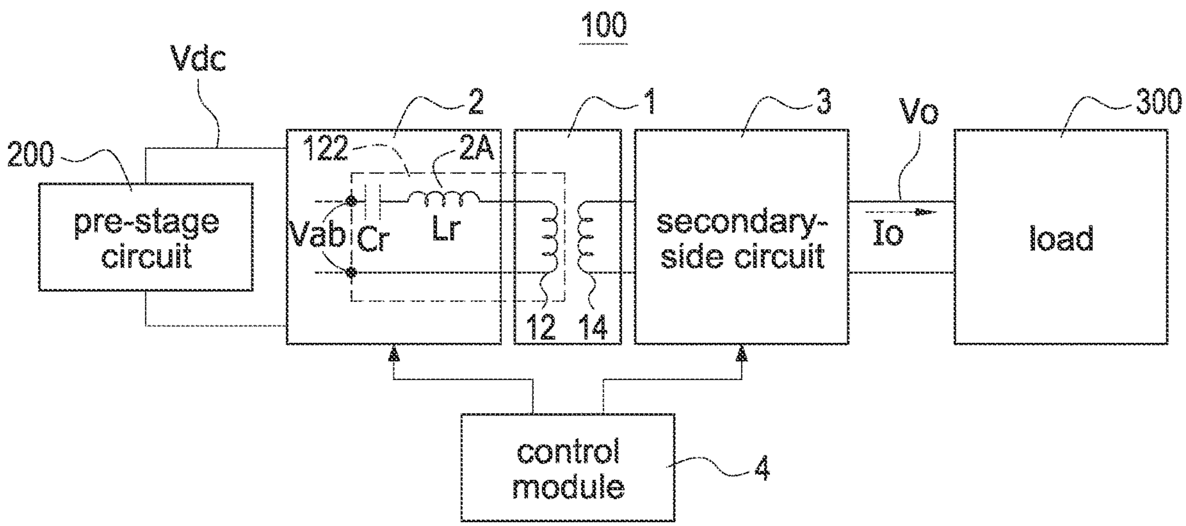
FIG. 2A is a block circuit diagram of a resonant converter with a function of frequency jitter according to the present disclosure.
Figure 2B:
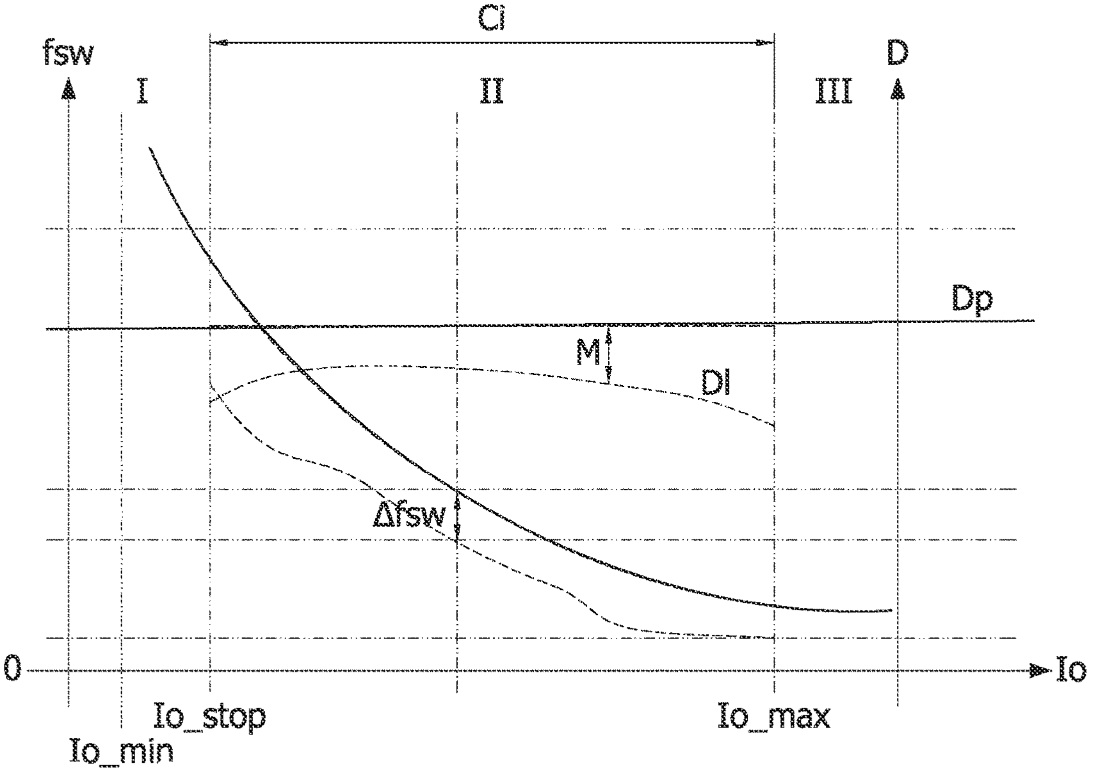
FIG. 2B is a current-frequency curve diagram of the resonant converter according to a first embodiment of the present disclosure.

Please refer to FIG. 2A, which shows a block circuit diagram of a resonant converter with a function of frequency jitter according to the present disclosure; please refer to FIG. 2B, which shows a current-frequency curve diagram of the resonant converter according to a first embodiment of the present disclosure, and also refer to FIG. 1A to FIG. 1D. The resonant converter 100 is coupled to a pre-stage circuit 200 and a load 300. The pre-stage circuit 200 may be, for example but not limited to, a DC power supply such as an AC-to-DC conversion circuit, a DC-to-DC conversion circuit, or a DC input power source. The resonant converter 100 converts a DC (direct current) voltage Vdc into an output voltage Vo, and provides an output current Io to the load 300 according to the power demand of the load 300. The resonant converter 100 includes a transformer 1, a primary-side circuit 2, a secondary-side circuit 3, and a control module 4. The transformer 1 includes a primary-side winding 12 and a secondary-side winding 14. The primary-side circuit 2 includes a resonant circuit 2A, and the resonant circuit 2A is coupled to the primary-side winding 12 to form a resonant module 122. The secondary-side circuit 3 is coupled to the secondary-side winding 14. In one embodiment, the resonant circuit 2A includes a resonant capacitor Cr and a resonant inductor Lr. Although the resonant capacitor Cr and the resonant inductor Lr are connected in series shown in figures, it is only a schematic example and is not limited thereto, that is, the resonant capacitor Cr and the resonant inductor Lr may also be connected in parallel.

The control module 4 is coupled to the primary-side circuit 2 and the secondary-side circuit 3, and the control module 4 controls the resonant converter 100 to convert the DC voltage Vdc into the output voltage Vo by controlling the primary-side circuit 2 and the secondary-side circuit 3. In one embodiment, the control module 4 includes a controller (such as, but not limited to, a microcontroller, a central processing unit, etc.) and sensing circuits (such as, but not limited to, a current sensor, a voltage sensor, etc.) for sensing current and voltage at the input end and/or the output end of the resonant converter 100.

As shown in FIG. 2B, Io_min represents the output current at a no-load condition and Io_max represents the output current at a full-load condition, i.e., the rated current. As the output current Io is lower, the operation frequency fsw of the resonant converter 100 is higher; conversely, as the output current Io is higher, the operation frequency fsw of the resonant converter 100 is lower. Under the frequency-varied operation, that is, the operation frequency fsw varies with the magnitude of the output current Io, when the resonant converter 100 converts the DC voltage Vdc into the output voltage Vo, a winding voltage Vab (which may be referred as an effective input voltage) is generated across two ends of the resonant module 122, and a duty cycle D of the winding voltage Vab is usually kept at a predetermined value Dp, such as, but not limited to, an upper limit value of 50%, but it may also be 45%, 40% or other values, which may be adjusted according to actual requirements. However, as shown in the related-art FIG. 1A to FIG. 1D, when the power supply is applied to the input of the DC voltage Vdc and the output current Io rises to a certain level, since the resonant converter 100 does not have a function of frequency jitter, the EMI suppression effect of the resonant converter 100 is extremely poor, and the EMI value measured by the resonant converter 100 may not meet the international standard values specified by, such as but not limited to, the International Electrotechnical Commission (IEC).

Therefore, in order to make the EMI value measured by the resonant converter 100 meet to the international standard values, the present disclosure uses the function of frequency jitter to reduce the EMI value when the output current Io rises to a certain level so that the EMI value meets the international standard values. Specifically, when the control module 4 detects that the output current Io of the resonant converter 100 is between a current interval Ci between the predetermined current Io_stop and the rated current Io_max, the control module 4 provides the function of frequency jitter. That is, control module 4 adjusts the duty cycle D of the winding voltage Vab by a variation M so that the duty cycle D does not remain at the predetermined value Dp. As the variation M is larger, the duty cycle D is smaller, otherwise the duty cycle D is larger. In particular, the variation M, which is calculated by the control module 4, varies between the predetermined value Dp and a threshold value Dl. The curve of the threshold value Dl can be adaptively adjusted according to the requirements of the resonant converter 100 (shown by dotted lines). For example, but not limited to, when the variation M is 10% and the upper limit value of the duty cycle D is 50%, the duty cycle D will vary between of the predetermined value Dp of 50% and the threshold value Dl of 40%. Alternatively, when the variation M is 5% and the duty cycle D is 45%, the duty cycle D will vary between the predetermined value Dp of 45% and the threshold value Dl of 40%, or between the predetermined value Dp of 45% and the threshold value Dl of 50%, and so forth.

On the other hand, since the resonant converter 100 has the function of frequency jitter, when the output current Io is a fixed value, the operation frequency fsw of the resonant converter 100 will vary with the variation M accordingly. Therefore, when the output current Io is in the current interval Ci, the operation frequency fsw will vary within a specific frequency range Δfsw, and the frequency range Δfsw is positively related to the variation M. For example, when the output current Io is fixed at 10A, i.e., in the current interval Ci, and when the current operation frequency fsw is 85 kHz, the variation M is calculated by the control module 4, and the duty cycle D of the winding voltage Vab is varied between the predetermined value Dp and the threshold value Dl. Moreover, the operation frequency fsw is varied between 85 kHz and 75 kHz or between 85 kHz and 95 kHz according to the variation M.

Therefore, when the variation M calculated by the control module 4 is smaller, in order to keep the winding voltage Vab fixed, the variation degree of the operation frequency fsw is also smaller. On the contrary, when the variation M calculated by the control module 4 is larger, in order to keep the winding voltage Vab fixed, the variation degree of the operation frequency fsw is also larger. On the other hand, from the EMI characteristics of converters (including DC-to-DC converters), it can be known that the larger the output current Io, the larger the N-order harmonic energy generated by the converter; on the contrary, the smaller the output current Io, the smaller the N-order harmonic energy generated by the converter.

This feature is limited by the EMI specification. When the output current Io is larger, the generated harmonic energy is larger, thereby making the EMI value closer to the maximum limit value. Conversely, when the output current Io is smaller, the generated harmonic energy is smaller, thereby making the EMI value away from the maximum limit value. Therefore, when the output current Io is larger (i.e., is greater than or equal to the predetermined current Io_stop), the EMI value of the resonant converter 100 can be controlled to meet the specified standard values by adjusting the duty cycle D by the variation M.

Figure 3A:
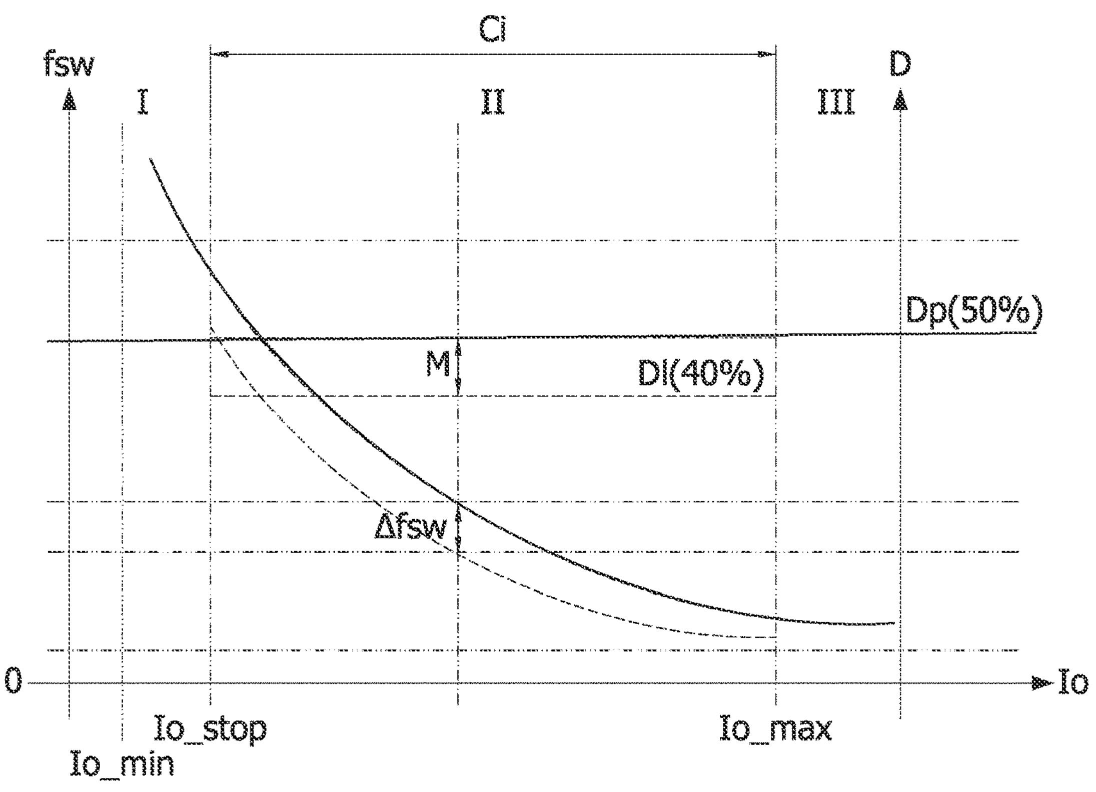
FIG. 3A is a current-frequency curve diagram of the resonant converter according to a second embodiment of the present disclosure.

Please refer to FIG. 3A, which shows a current-frequency curve diagram of the resonant converter according to a second embodiment of the present disclosure, and also refer to FIG. 2A and FIG. 2B. In response to the difference of the output current Io, the operation of the resonant converter 100 is performed by changing the duty cycle D of the winding voltage Vab and matching the EMI characteristics of the converter itself. When the output current Io is larger, the generated harmonic energy is also larger, and therefore in order to comply with the regulatory restrictions, the adjustment of the variation M is relatively larger. Conversely, when the output current Io is smaller, the generated harmonic energy is also smaller, and the adjustment of the variation M is relatively smaller or may remain unchanged.

Therefore, when the control module 4 detects that the output current Io is less than the predetermined current Io_stop (interval I) or greater than the rated current Io_max (interval III), the control module 4 fixes the duty cycle D at the predetermined value Dp (such as, but not limited to 50%) to make the EMI value of the resonant converter 100 meet the specified standard values. In other words, when the output current Io is not in the current interval Ci, the control module 4 controls the variation M to be zero so that the duty cycle D is fixed at the predetermined value Dp. Therefore, in interval I and interval III, the operation frequency fsw is a variable frequency, which changes according to the increase or decrease of the output current Io, and when the output current Io is a fixed value, the operation frequency fsw is approximately constant.

When the control module 4 detects that the output current Io is in the current interval Ci (interval II), the duty cycle D of the winding voltage Vab is the predetermined value Dp minus the variation M, and the control module 4 sets the threshold value Dl of the variation M to be a fixed value, i.e., as a horizontal line. Similarly, the frequency range Δfsw is in a specific range corresponding to the threshold value Dl. Therefore, in the interval II, the operation frequency fsw is still a variable frequency, which changes according to the increase or decrease of the output current Io. In addition, in section II, when the output current Io is a fixed value, the variation M varies between the predetermined value Dp and the threshold value Dl according to the calculation of the control module 4, and the operation frequency fsw varies in a specific range correspondingly with the variation M. In the interval II, it is assumed that the predetermined value Dp of the duty cycle D is the upper limit value of 50% and the variation M is 10%, and therefore the threshold value Dl is 40% (i.e., 50% minus 10%). Correspondingly, when the predetermined value Dp is the upper limit value of 50%, the corresponding operation frequency fsw is 85 kHz, and the frequency range Δfsw corresponding to the variation M of 10% is 10 KHZ, and therefore the operation frequency fsw varies between 85 kHz and 75 kHz according to the variation M. In one embodiment, when the predetermined value Dp of the duty cycle D is set to other values, the logic can be deduced as described above, and will not be repeated here.

Figure 3B:
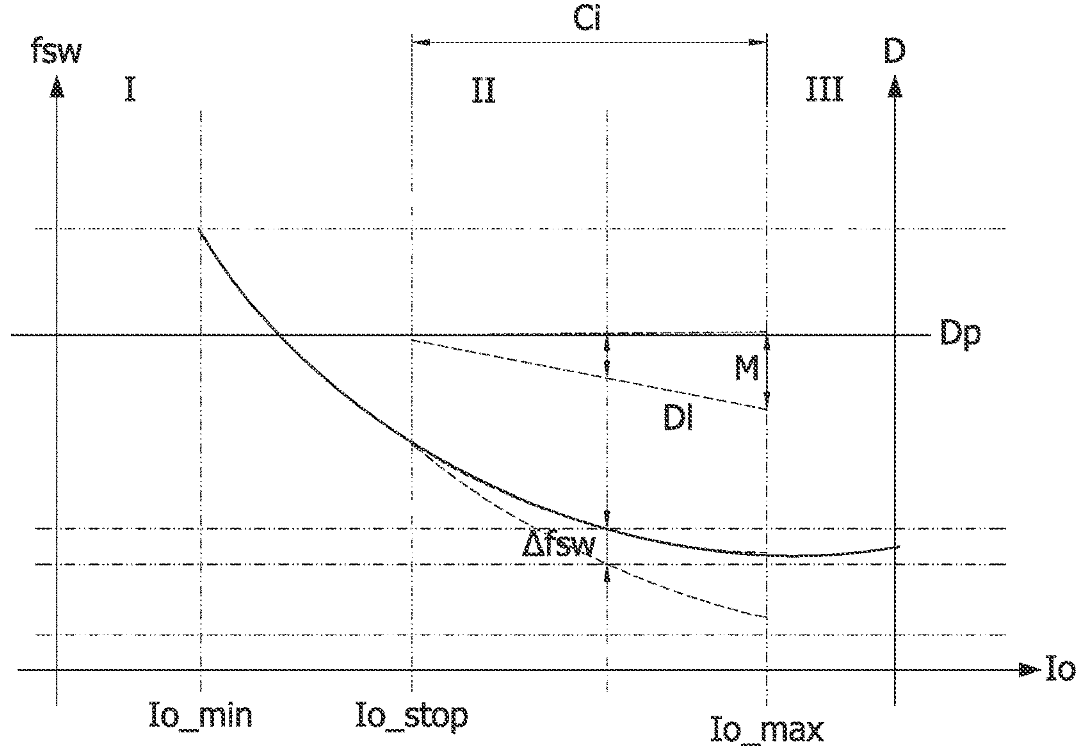
FIG. 3B is a current-frequency curve diagram of the resonant converter according to a third embodiment of the present disclosure.

Please refer to FIG. 3B, which shows a current-frequency curve diagram of the resonant converter according to a third embodiment of the present disclosure, and also refer to FIG. 2A to FIG. 3A. The difference between the third embodiment shown in FIG. 3B and the second embodiment shown in FIG. 3A is that when the control module 4 detects that the output current Io is in the current interval Ci (interval II), the control module 4 sets the threshold value Dl of the variation M to decrease according to the increase of the output current Io (that is, the threshold value Dl is as a curve with a negative slope). Similarly, the frequency range Δfsw increases corresponding to the decrease of the threshold value Dl. Specifically, since the output current Io is larger, the N-order harmonic energy generated by the current converter 100 is larger. Therefore, the decrease of the threshold value Dl of the variation M according to the increase of the output current Io can make the larger output current Io have a better EMI suppression effect so as to make the EMI value less likely to approach the maximum limit value. Incidentally, for the technical content not described in FIG. 3B, please refer to FIG. 3A and the corresponding descriptions thereof, which will not be repeated here.

Figure 4A:
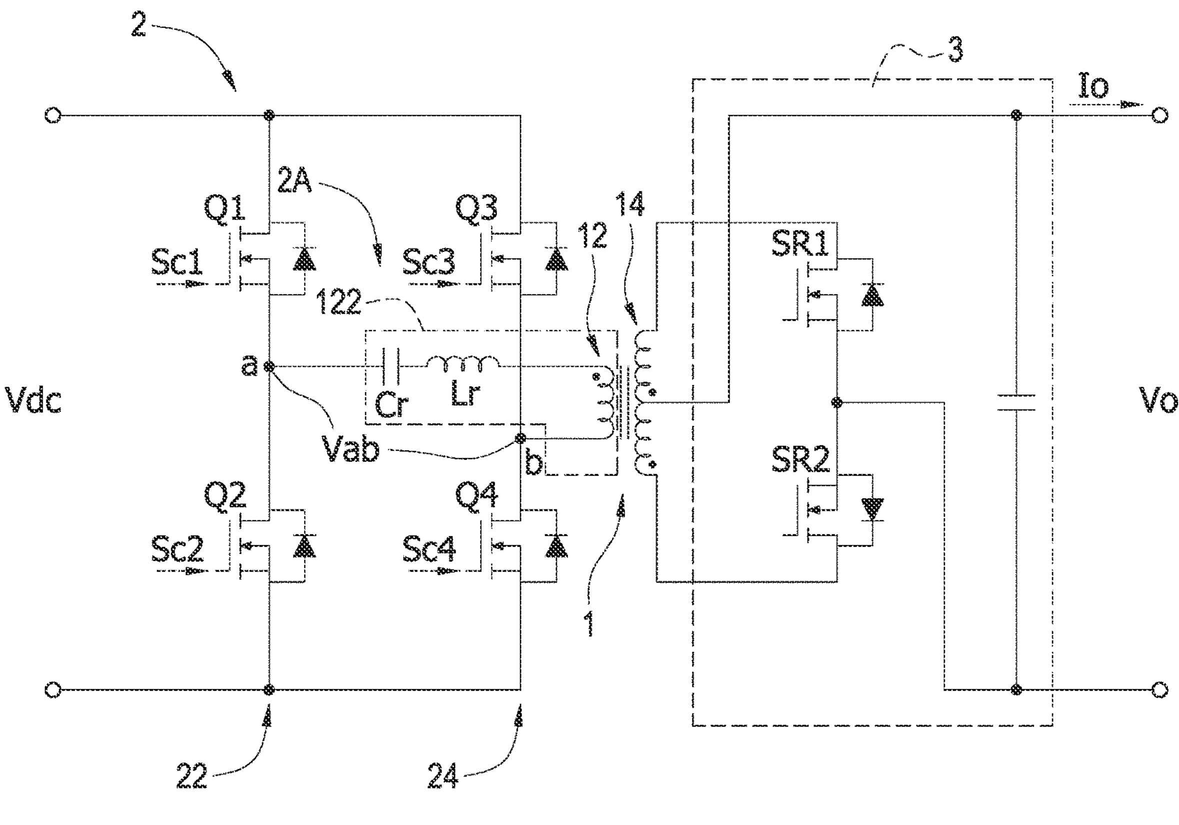
FIG. 4A is a block circuit diagram of the resonant converter with the function of frequency jitter according to a first embodiment of the present disclosure.
Figure 4B:
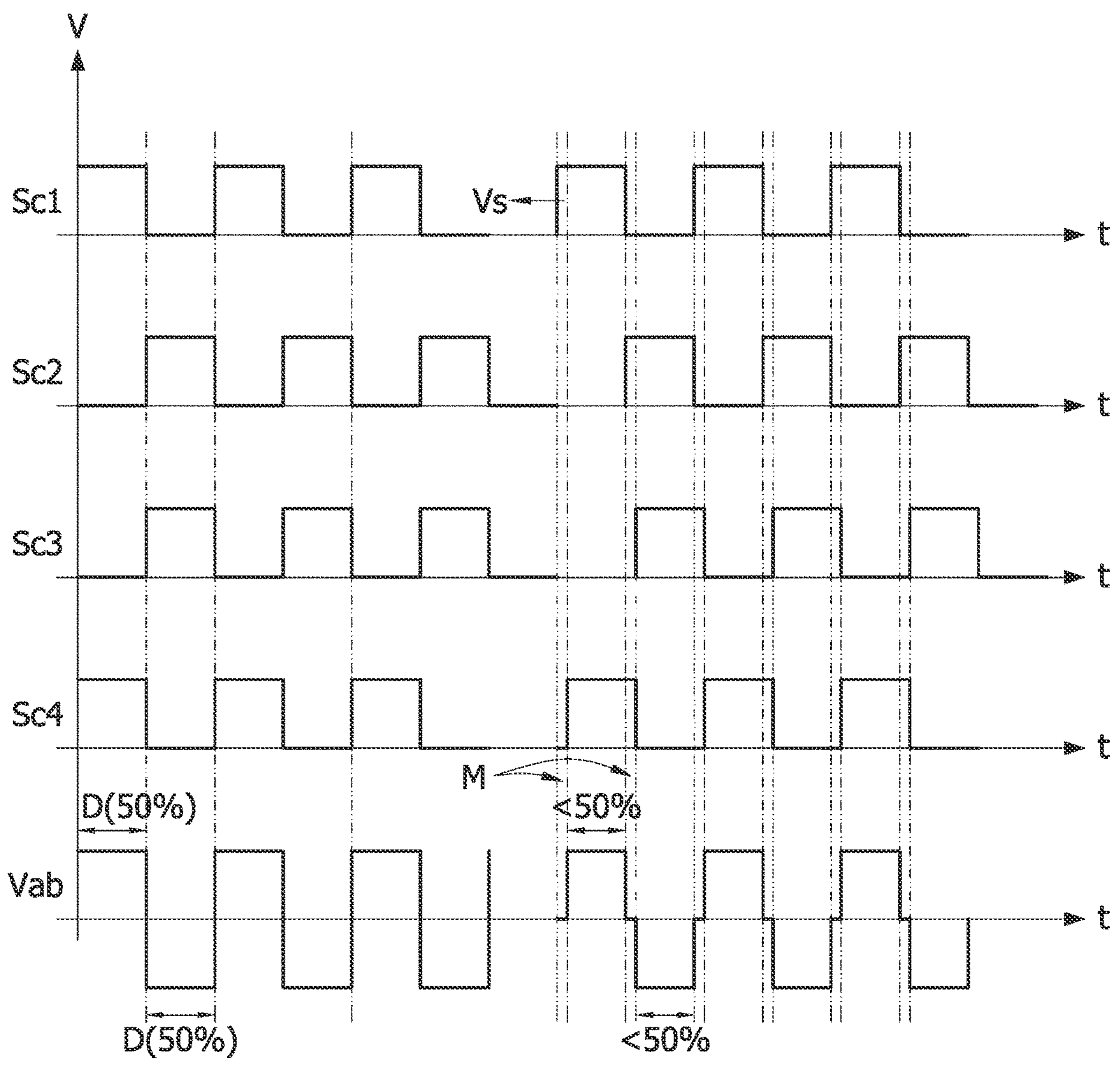
FIG. 4B is a signal waveform diagram of the resonant converter with the function of frequency jitter according to the first embodiment of the present disclosure.

Please refer to FIG. 4A, which shows a block circuit diagram of the resonant converter with the function of frequency jitter according to a first embodiment of the present disclosure; please refer to FIG. 4B, which shows a signal waveform diagram of the resonant converter with the function of frequency jitter according to the first embodiment of the present disclosure, and also refer to FIG. 2A to FIG. 3B. As shown in FIG. 4A, the resonant converter 100 is a full-bridge resonant converter, and the primary-side circuit 2 further includes a first bridge arm 22 and a second bridge arm 24 connected in parallel. The first bridge arm 22 includes a first switch Q1 and a second switch Q2 connected in series, and the second bridge arm 24 includes a third switch Q3 and a fourth switch Q4 connected in series. A first end a of the resonant module 122 is coupled between the first switch Q1 and the second switch Q2, and a second end b of the resonant module 122 is coupled between the third switch Q3 and the fourth switch Q4. The control module 4 provides a first control signal Sc1 to control the first switch Q1, provides a second control signal Sc2 to control the second switch Q2, provides a third control signal Sc3 to control the third switch Q3, and provides a fourth control signal Sc4 to control the fourth switch Q4. Therefore, as shown in FIG. 4A, the primary-side circuit 2 is controlled by the control module 4 to convert the DC voltage Vdc so as to generate a winding voltage Vab across the first end a and the second end b of the resonant module 122.

In the waveform diagram of FIG. 4B, the signal waveform on the left half corresponds to interval I or interval III shown in FIG. 3A or FIG. 3B, and the signal waveform on the right half corresponds to interval II shown in FIG. 3A or FIG. 3B. Take the predetermined value Dp with a duty cycle D of 50% as an example. When the control module 4 detects that the output current Io is not in the current range Ci (i.e., in interval I or in interval III), the control module 4 provides the first control signal Sc1 and the fourth control signal Sc4 with the same phase, provides the second control signal Sc2 complementary to the first control signal Sc1, and provides the third control signal Sc3 complementary to the fourth control signal Sc4. Therefore, the winding voltage Vab forms a waveform with positive and negative alteration, and there is no dead time. However, the control signals are not limited to being completely complementary, and additional dead time may also be included between two complementary control signals.

When the control module 4 detects that the output current Io is in the current interval Ci, the control module 4 controls a phase shift Vs of the phase variation of the first control signal Sc1 and the fourth control signal Sc4 so that the duty cycle D during the positive half cycle is decreased due to the sum of the first control signal Sc1 and the fourth control signal Sc4 (that is, the winding voltage Vab is generated due to a current path when the first switch Q1 and the fourth switch Q4 are both turned on), thereby adjusting the variation M by adjusting the phase shift Vs. In this embodiment, the first control signal Sc1 and the second control signal Sc2 are complementary (i.e., correspondingly opposite) and the third control signal Sc3 and the fourth control signal Sc4 are complementary (i.e., correspondingly opposite). Therefore, as long as the first control signal Sc1 or the fourth control signal Sc4 is adjusted, the second control signal Sc2 or the third control signal Sc3 can be accordingly adjusted.

On the other hand, when the control module 4 detects that the output current Io is in the current interval Ci, the control module 4 controls a phase shift Vs of the phase variation of the second control signal Sc2 and the third control signal Sc3 so that the duty cycle D during the negative half cycle is decreased due to the sum of the second control signal Sc2 and the third control signal Sc3, thereby adjusting the variation M by adjusting the phase shift Vs. The operation method is substantially the same as that of the above-mentioned first control signal Sc1 and fourth control signal Sc4, and will not be repeated here. As shown in FIG. 4B, although it only discloses a schematic example of controlling the first control signal Sc1 to lead the fourth control signal Sc4 by the phase shift Vs, or controlling the second control signal Sc2 to lead the third control signal Sc3 by the phase shift Vs, but it does not exclude various possibility of implementations. That is, the method of phase lag of the control signals may be used to control the corresponding switches, and the principles are similar and will not be repeated here.

Figure 4C:
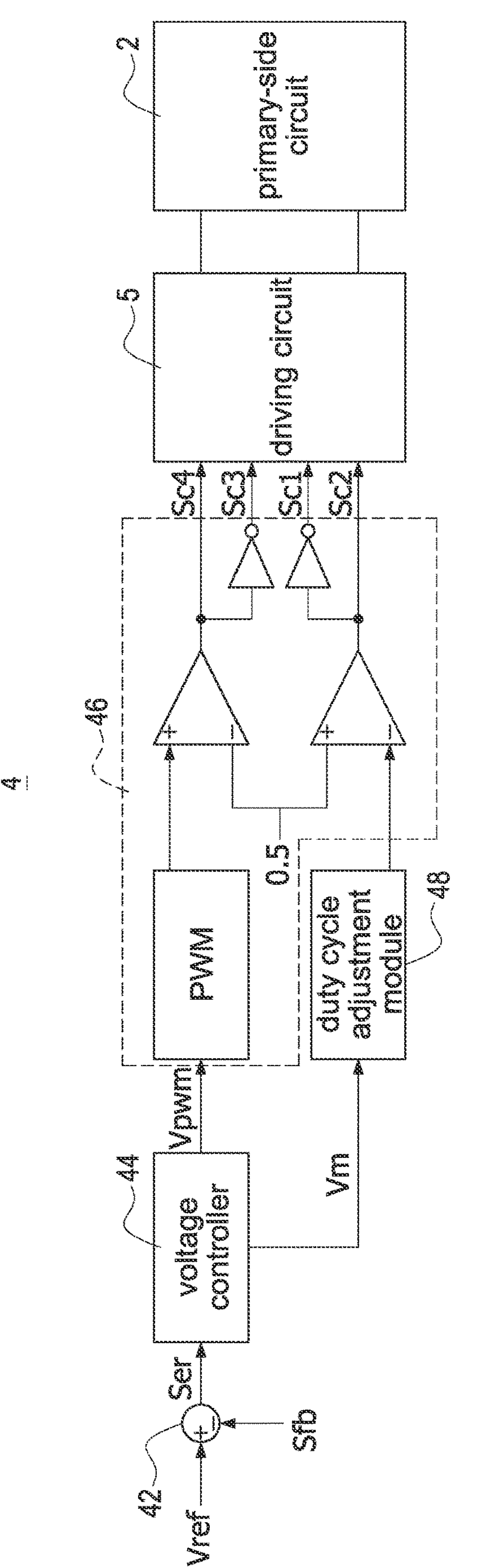
FIG. 4C is a block circuit diagram of a control module of the resonant converter with the function of frequency jitter according to the first embodiment of the present disclosure.

Please refer to FIG. 4C, which shows a block circuit diagram of a control module of the resonant converter with the function of frequency jitter according to the first embodiment of the present disclosure, and also refer to FIG. 2A to FIG. 4B. The control module 4 includes a comparator 42, a voltage controller 44, a pulse-width modulator 46, and a duty cycle adjustment module 48. The comparator 42 compares a feedback signal Sfb corresponding to the output voltage Vo with a reference voltage Vref to provide an error signal Ser. The voltage controller 44 generates a pulse-width modulation value Vpwm and a variation value Vm corresponding to the variation M according to the error signal Ser. In particular, since the pulse-width modulation value Vpwm is generated according to a voltage error between the feedback signal Sfb and the reference voltage Vref, and the output voltage Vo varies with the output current Io drawn by the load 300, the pulse-width modulation value Vpwm reflects the magnitude of the output current Io. Therefore, the pulse-width modulation value Vpwm and the variation value Vm are varied according to the magnitude of the output current Io.

The pulse-width modulator 46 modulates the first control signal Sc1, the second control signal Sc2, the third control signal Sc3, and the fourth control signal Sc4 according to the pulse-width modulation value Vpwm, that is, the control signals Sc1-Sc4 are pulse-width modulation signals. The duty cycle adjustment module 48 adjusts the phase shift Vs of the control signals Sc1-Sc4 according to the variation value Vm, and therefore the duty cycle D of the winding voltage Vab is adjusted by the variation M so that the duty cycle D does not remain at the predetermined value Dp. In particular, the duty cycle adjustment module 48 may be, for example but not limited to, a phase adjustment circuit for phase shifting (that is, phase leading or lagging) the control signals Sc1-Sc4. In one embodiment, a driving circuit 5 is further included between the pulse-width modulator 46 and the primary-side circuit 2. The driving circuit 5 is a driving device designed to effectively utilize light current (weak current) signals to drive high-power switches. When the control signals Sc1-Sc4 can successfully drive the first bridge arm 22 and the second bridge arm 24 without the driving circuit 5, the additional driving circuit 5 may not be required. In one embodiment, it is not limited that the components in the control module 4 must be implemented according to this circuit structure. For example, any component, circuit or software program that can achieve the same function should be included in the scope of the present disclosure, for example, a comparator is not limited to be used to execute the comparison function, and a control software program is written to make the controller control the resonant converter.

Figure 5A:
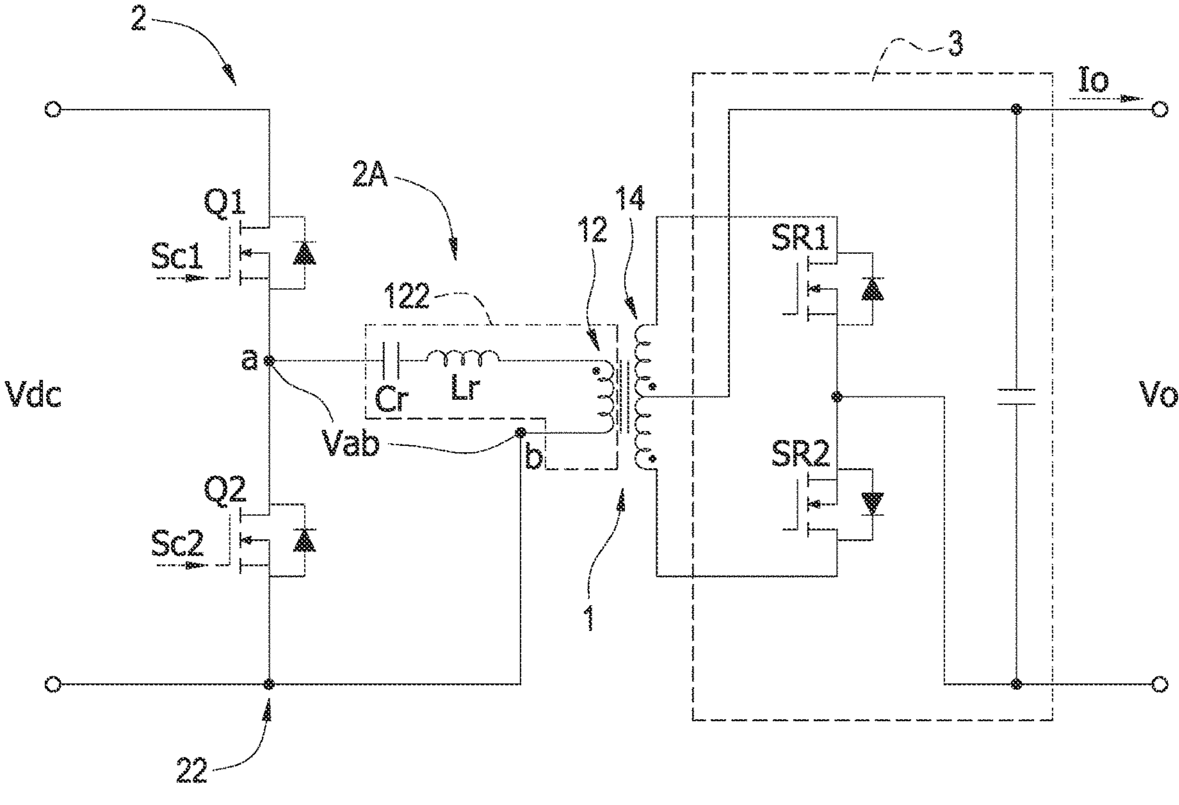
FIG. 5A is a block circuit diagram of the resonant converter with the function of frequency jitter according to a second embodiment of the present disclosure.
Figure 5B:
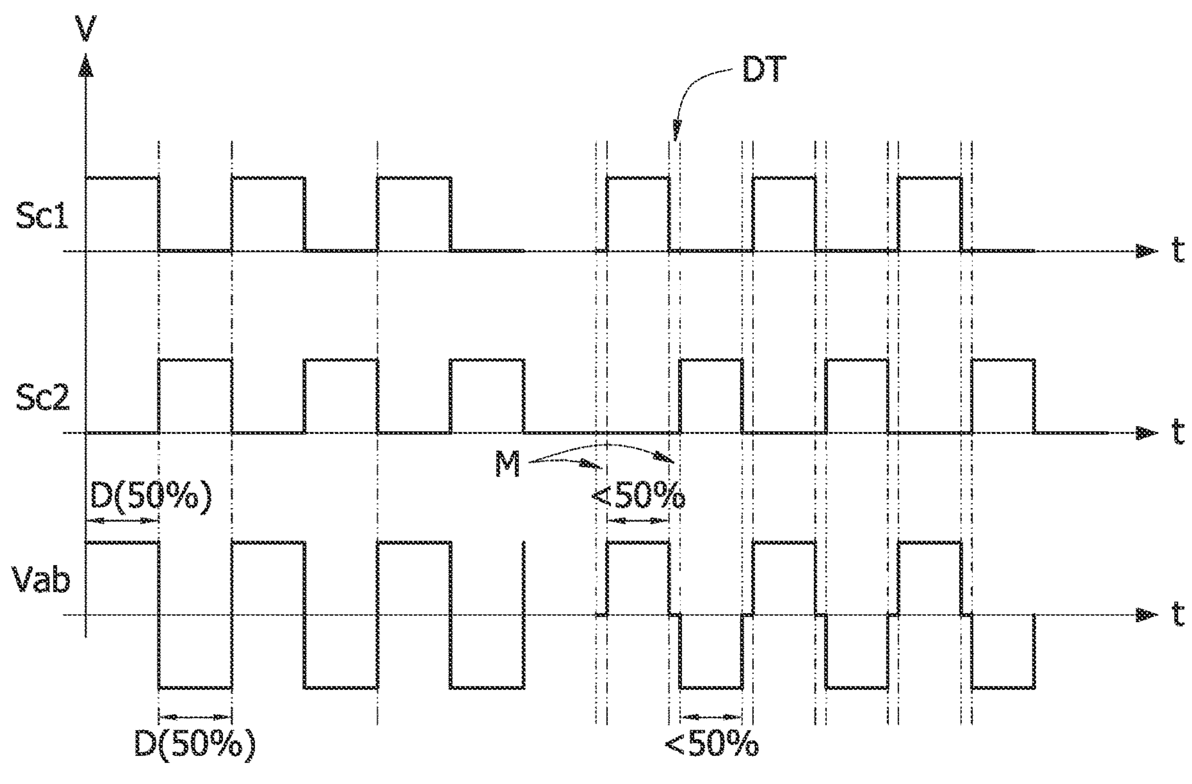
FIG. 5B is a signal waveform diagram of the resonant converter with the function of frequency jitter according to the second embodiment of the present disclosure.

Please refer to FIG. 5A, which shows a block circuit diagram of the resonant converter with the function of frequency jitter according to a second embodiment of the present disclosure; please refer to FIG. 5B, which shows a signal waveform diagram of the resonant converter with the function of frequency jitter according to the second embodiment of the present disclosure, and also refer to FIG. 2A to FIG. 4C. As shown in FIG. 5A, the resonant converter 100 is a half-bridge resonant converter, and the primary-side circuit 2 further includes a first bridge arm 22. The first bridge arm 22 includes a first switch Q1 and a second switch Q2 connected in series, and the resonant module 122 is connected to the second switch Q2 in parallel. The control module 4 provides a first control signal Sc1 to control the first switch Q1 and provides a second control signal Sc2 to control the second switch Q2. Therefore, as shown in FIG. 5B, the primary-side circuit 2 is controlled by the control module 4 to convert the DC voltage Vdc so as to generate a winding voltage Vab across a first end a and a second end b of the resonant module 122.

In the waveform diagram of FIG. 5B, the technical content of the signal waveform on the left half is similar to that of FIG. 4B, and will not be repeated here. In the signal waveform on the right half, since the first control signal Sc1 and the second control signal Sc2 cannot be phase shifted, the dead time can be used to adjust the variation M. Specifically, when the control module 4 detects that the output current Io is in the current interval Ci, the dead time DT of the first control signal Sc1 and the second control signal Sc2 is adjusted so that the duty cycle D of the winding voltage Vab during the positive half cycle or the negative half cycle to be decreased, thereby adjusting the variation M by adjusting the dead time DT. In this embodiment, the first control signal Sc1 and the second control signal Sc2 are complementary (i.e., correspondingly opposite). Therefore, as long as the first control signal Sc1 is adjusted, the second control signal Sc2 can be accordingly adjusted.

Figure 5C:
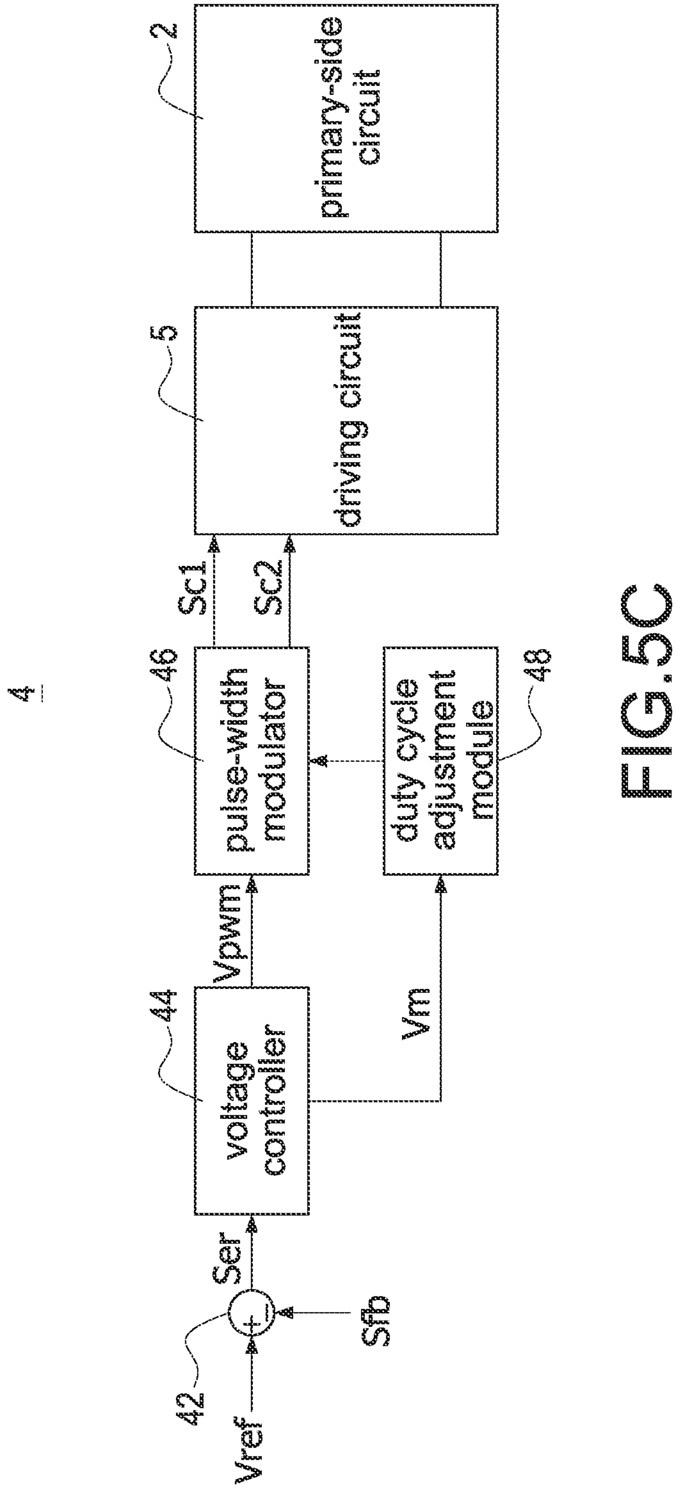
FIG. 5C is a block circuit diagram of a control module of the resonant converter with the function of frequency jitter according to the second embodiment of the present disclosure.

Please refer to FIG. 5C, which shows a block circuit diagram of a control module of the resonant converter with the function of frequency jitter according to the second embodiment of the present disclosure, and also refer to FIG. 2A to FIG. 5B. The difference between the control module 4 shown in FIG. 5C and the control module 4 shown in FIC. 4C is that the pulse-width modulator 46 modulates the first control signal Sc1 and the second control signal Sc2 according to the pulse-width modulation value Vpwm, and the duty cycle adjustment module 48 adjusts the dead time DT of the first control signal Sc1 and the second control signal Sc2. In particular, the duty cycle adjustment module 48 may be, for example but not limited to, a time delay circuit and other circuits for generating the dead time DT, but is not limited thereto. Incidentally, for the technical content not described in FIG. 5C, please refer to FIG. 4C and the corresponding descriptions thereof, which will not be repeated here. In one embodiment, the resonant converter 100 is not limited to the LLC structure shown in FIG. 4A and FIG. 5A. For example, any converter that can utilize resonance for DC conversion should be included in the scope of the present disclosure.

Figure 6A:
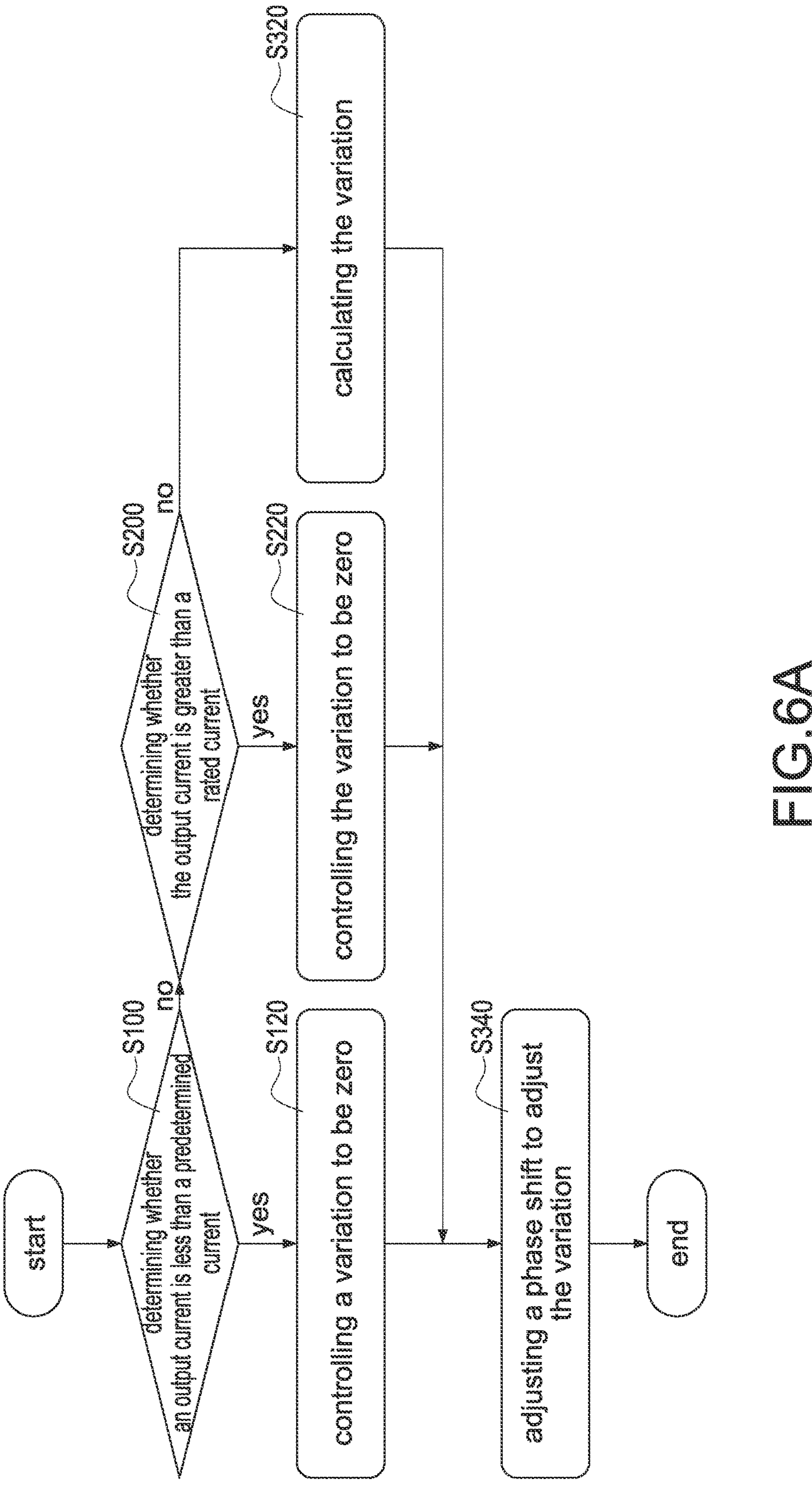
FIG. 6A is a flowchart of a method of operating the resonant converter with the function of frequency jitter according to a first embodiment of the present disclosure.

Please refer to FIG. 6A, which shows a flowchart of a method of operating the resonant converter with the function of frequency jitter according to a first embodiment of the present disclosure, and also refer to FIG. 2A to FIG. 5C. The method shown in FIG. 6A mainly matches to FIG. 3A, and the control module 4 of the resonant converter 100 can preset parameters such as the predetermined current Io_stop, the predetermined value Dp, the threshold value Dl, etc. The method of operating the resonant converter 100 includes steps as follows. First, it is to determine whether the output current Io is less than the predetermined current Io_stop (step S100). When the control module 4 determines that the output current Io is less than the predetermined current Io_stop (interval I), the variation M is controlled to be zero (step S120). When the control module 4 determines that the output current Io is not less than the predetermined current Io_stop (interval II), it is to determine whether the output current Io is greater than the rated current (step S200). When the control module 4 determines that the output current Io is greater than the rated current Io_max (interval III), the variation M is controlled to be zero (step S220). In particular, the sequence of steps S100 and S200 can be reversed, and when the determination results of steps S100 and S200 are both "No", it means that the output current Io is in the current interval Ci, and therefore the variation M is calculated (step S320). Finally, it is to adjust the phase shift of the control signals so as to adjust the variation M (step S340).

In steps S120 and S220, since the variation M is zero, no phase shift of control signals Sc1-Sc4 is required in step S340 so that the duty cycle D is fixed at the predetermined value Dp. In step S320, since the variation M is not zero, the control module 4 adjusts the phase shift Vs of the control signals Sc1-Sc4 according to the calculated variation value Vm (corresponding to the variation M) so that the duty cycle D of the winding voltage Vab varies between the predetermined value Dp minus the variation M and the predetermined value Dp in step S340. Therefore, the EMI value of the resonant converter 100 from no load to full load can all meet the international standard values. Incidentally, the detailed operations of the resonant converter 100 may be referred to FIG. 2A to FIG. 5C, and will not be repeated here.

Figure 6B:
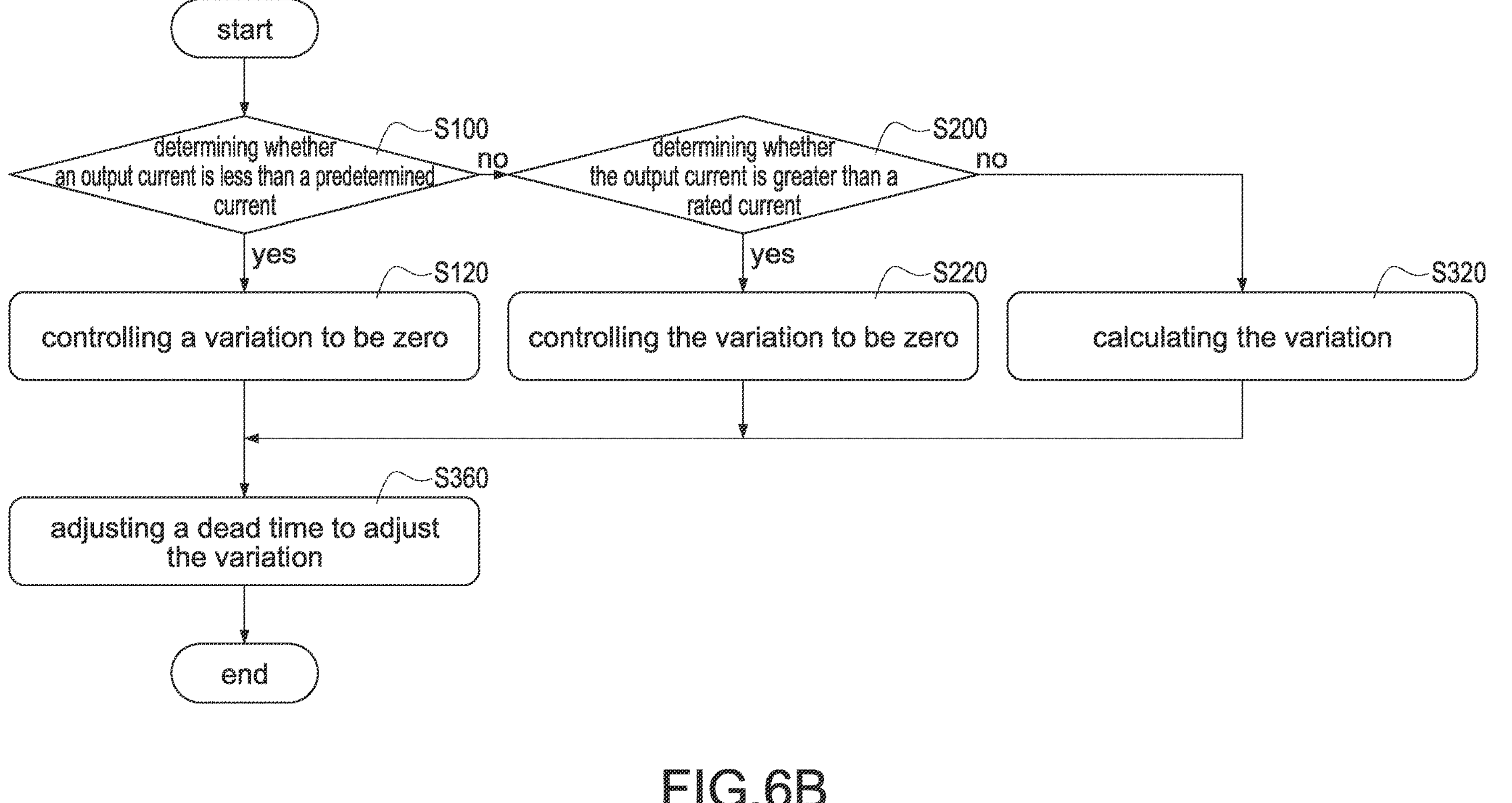
FIG. 6B is a flowchart of a method of operating the resonant converter with the function of frequency jitter according to a second embodiment of the present disclosure.

Please refer to FIG. 6B, which shows a flowchart of a method of operating the resonant converter with the function of frequency jitter according to a second embodiment of the present disclosure, and also refer to FIG. 2A to FIG. 6A. In step S320, since the variation M is zero, the control module 4 adjusts the dead time DT of the control signals Sc1-Sc2 according to the calculated variation value Vm (corresponding to the variation M) so that the duty cycle D of the winding voltage Vab varies between the predetermined value Dp minus the variation M and the predetermined value Dp in step S360. Therefore, the EMI value of the resonant converter 100 from no load to full load can all meet the international standard values. Incidentally, the steps not described in FIG. 6B are the same as those in FIG. 6A and the detailed operations of the resonant converter 100 may be referred to FIG. 2A to FIG. 5C, and will not be repeated here.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A method of operating a resonant converter, the resonant converter comprising a transformer and a primary-side circuit; the primary-side circuit comprising a resonant circuit, and the resonant circuit being coupled to a primary-side winding of the transformer to form a resonant module, the method comprising steps of:

controlling the primary-side circuit to convert a DC voltage so as to control the resonant converter converting the DC voltage into an output voltage to generate a winding voltage at two ends of the resonant module, detecting an output current of the resonant converter, and adjusting a duty cycle of the winding voltage with a variation when determining that the output current is in a current interval between a predetermined current and a rated current, so that the duty cycle does not remain at a predetermined value, adjusting the duty cycle to control an operation frequency of the resonant convert to vary within a frequency range, and the frequency range is positively related to the variation, and setting a threshold value of the variation to decrease according to the increase of the output current, and the frequency range is expanded according to the decrease of the threshold value.

2. The method of operating the resonant converter as claimed in claim 1, further comprising a step of:

fixing the duty cycle to the predetermined value when the output current is less than the predetermined current or is greater than the rated current.

3. The method of operating the resonant converter as claimed in claim 1, further comprising a step of:

setting a threshold value of the variation to a fixed value, and the frequency range is in a specific range corresponding to the threshold value.

4. The method of operating the resonant converter as claimed in claim 1, wherein the primary-side circuit comprises a first bridge arm and a second bridge arm connected in parallel; the first bridge arm comprises a first switch and a second switch, and the second bridge arm comprises a third switch and a fourth switch, the method further comprises steps of:

providing a first control signal to control the first switch, providing a second control signal to control the second switch, providing a third control signal to control the third switch, and providing a fourth control signal to control the fourth switch, and controlling a phase shift of phase variation of the first control signal and the fourth control signal to adjust the variation when the output current is in the current interval; or controlling the phase shift of phase variation of the second control signal and the third control signal to adjust the variation when the output current is in the current interval.

5. The method of operating the resonant converter as claimed in claim 4, further comprising steps of:

comparing a feedback signal corresponding to the output voltage with a reference voltage to provide an error signal, generating a pulse-width modulation value and a variation value corresponding to the variation according to the error signal, modulating the first control signal, the second control signal, the third control signal, and the fourth control signal according to the pulse-width modulation value, and adjusting the phase shift according to the variation value.

6. The method of operating the resonant converter as claimed in claim 1, wherein the primary-side circuit comprises a first bridge arm, and the first bridge arm comprises a first switch and a second switch, the method further comprises steps of:

providing a first control signal to control the first switch and providing a second control signal to control the second switch, and adjusting a dead time between the first control signal and the second control signal to adjust the variation when the output current is in the current interval.

7. The method of operating the resonant converter as claimed in claim 6, further comprising steps of:

comparing a feedback signal corresponding to the output voltage with a reference voltage to provide an error signal, generating a pulse-width modulation value and a variation value corresponding to the variation according to the error signal, modulating the first control signal and the second control signal according to the pulse-width modulation value, and adjusting the dead time according to the variation value.

8. A method of operating a resonant converter, the resonant converter comprising a transformer and a primary-side circuit, and the primary-side circuit comprising a resonant circuit and a first bridge arm; the resonant circuit being coupled to a primary-side winding of the transformer to form a resonant module, and the first bridge arm comprises a first switch and a second switch, the method comprising steps of:

controlling the primary-side circuit to convert a DC voltage so as to control the resonant converter converting the DC voltage into an output voltage to generate a winding voltage at two ends of the resonant module, detecting an output current of the resonant converter, and adjusting a duty cycle of the winding voltage with a variation when determining that the output current is in a current interval between a predetermined current and a rated current, so that the duty cycle does not remain at a predetermined value, adjusting the duty cycle to control an operation frequency of the resonant convert to vary within a frequency range, and the frequency range is positively related to the variation, providing a first control signal to control the first switch and providing a second control signal to control the second switch, and adjusting a dead time between the first control signal and the second control signal to adjust the variation when the output current is in the current interval.

9. The method of operating the resonant converter as claimed in claim 8, further comprising a step of:

fixing the duty cycle to the predetermined value when the output current is less than the predetermined current or is greater than the rated current.

10. The method of operating the resonant converter as claimed in claim 8, further comprising a step of:

setting a threshold value of the variation to a fixed value, and the frequency range is in a specific range corresponding to the threshold value.

11. The method of operating the resonant converter as claimed in claim 8, wherein the primary-side circuit comprises a first bridge arm and a second bridge arm connected in parallel; the first bridge arm comprises a first switch and a second switch, and the second bridge arm comprises a third switch and a fourth switch, the method further comprises steps of:

providing a first control signal to control the first switch, providing a second control signal to control the second switch, providing a third control signal to control the third switch, and providing a fourth control signal to control the fourth switch, and controlling a phase shift of phase variation of the first control signal and the fourth control signal to adjust the variation when the output current is in the current interval; or controlling the phase shift of phase variation of the second control signal and the third control signal to adjust the variation when the output current is in the current interval.

12. The method of operating the resonant converter as claimed in claim 11, further comprising steps of:

comparing a feedback signal corresponding to the output voltage with a reference voltage to provide an error signal, generating a pulse-width modulation value and a variation value corresponding to the variation according to the error signal, modulating the first control signal, the second control signal, the third control signal, and the fourth control signal according to the pulse-width modulation value, and adjusting the phase shift according to the variation value.

13. The method of operating the resonant converter as claimed in claim 8, further comprising steps of:

comparing a feedback signal corresponding to the output voltage with a reference voltage to provide an error signal, generating a pulse-width modulation value and a variation value corresponding to the variation according to the error signal, modulating the first control signal and the second control signal according to the pulse-width modulation value, and adjusting the dead time according to the variation value.

* * * * *